United States Patent [19]

Yoshida et al.

[11] Patent Number: 5,036,407
[45] Date of Patent: Jul. 30, 1991

[54] DEVICE FOR DETECTING TAPE CHARACTERISTICS AND HEAD POSITION

[75] Inventors: Susumu Yoshida; Sei Onishi; Kenji Uchiyama, all of Saitama, Japan

[73] Assignee: Pioneer Electronic Corporation, Tokyo, Japan

[21] Appl. No.: 351,250

[22] Filed: May 15, 1989

[30] Foreign Application Priority Data

Jul. 28, 1988 [JP] Japan .................................. 63-99080

[51] Int. Cl.⁵ .......................... G11B 5/02; G11B 5/54
[52] U.S. Cl. ....................................... 360/25; 360/105
[58] Field of Search .................... 360/25, 71, 104, 105, 360/109

[56] References Cited

U.S. PATENT DOCUMENTS 3,864,738 2/1975 Syohji ................................. 360/25

Primary Examiner—John H. Wolff
Assistant Examiner—Won Tae Christopher Kim
Attorney, Agent, or Firm—Sughrue, Mion, Zinn, Macpeak & Seas

[57] ABSTRACT

An improved detection device for detecting whether a tape is a normal tape or a chrome or metallic tape and for detecting whether the recording head is at an eject position, a stop position or a recording/reproducing position. The device includes an operating piece movable in accordance with the movement of the recording head, a switching piece for turning ON and OFF a switch, the switching piece having a cam surface engageable with the operating piece, a detecting piece having a cam surface engageable with the operating piece and having a detecting portion insertable into a tape characteristic hole formed in a cassette half, and a second switch adapted to be turned ON and OFF in accordance with the movement with the head.

8 Claims, 3 Drawing Sheets

DEVICE FOR DETECTING TAPE CHARACTERISTICS AND HEAD POSITION

BACKGROUND OF THE INVENTION

1. Field of the Invention

This invention relates to an improved device for detecting tape characteristics and the position of a head in which in order to determine the characteristics of an equalizer, it is determined whether the tape is a normal tape of 120 μ or a chrome or metallic tape of 70 μ and in which it is determined whether the head is at an eject position where the head is spaced apart from a cassette half, at a music stop position where the head is in slight contact with the tape, or at a recording/reproducing position where the head is in intimate contact with the tape.

2. Background

In order to determine whether the characteristics of an equalizer to be selected when effecting the recording or the reproduction is 70 μ or 120 μ, a tape cassette having a chrome tape or a metallic tape of 70 μ characteristics has conventionally been provided with a characteristic hole.

In a cassette tape player, the characteristics of the equalizer are switched by a switch which is operated depending on whether a detecting element is inserted into the characteristic hole or not. Further, it is determined by the ON-OFF operation of switches whether the head is at the eject position, the music stop-detecting position or the recording/reproducing position, using a combination of at least two switches.

Accordingly, in the prior art device for detecting tape characteristics and the head position through the ON-OFF operation of switches, there have been required three switches, that is, one for detecting the tape characteristics and the other two for detecting the head position as described.

SUMMARY OF THE INVENTION

An object of this invention is to carry out the detection of tape characteristics and the detection of the head position using two switches in such a manner that a switch for detecting the tape characteristics also serves as a switch for detecting the head position.

The present invention seeks to solve the above problems, and according to the invention, there is provided a device for detecting tape characteristics and the position of a head, comprising: an operating piece movable in accordance with the movement of a head bed on which the head is mounted; a switching piece for turning on and off the switch, the switching piece having a cam surface engageable with the operating piece; a detecting piece having a cam surface engageable with the operating piece and having a detecting portion insertable into a tape characteristic hole formed in a cassette half; and a second switch adapted to be turned on and off in accordance with the movement of the head bed.

In the device for detecting the tape characteristics and the head position provided in accordance with the present invention, when the head bed is in the eject position, the switch is maintained in the ON state through the action of the operating piece on the cam surfaces of the switching piece and detecting piece, the detecting piece is in the inoperative condition, and the second switch is in the OFF state.

Then, when the head bed reaches the music stop-detecting position, the switching piece turns on the switch through the action of the operating piece on the cam surface of the switching piece, thereby detecting the arrival of the head bed at the music stop-detecting position.

Further, when the head bed reaches the recording/reproducing position, the second switch is turned on to detect the arrival of the head bed at this position, and the detecting piece is allowed to move through the action of the operating piece on the cam surface, so that the detecting portion determines whether the cassette half has the characteristic hole or not. In accordance with the result of this detection, the switch is turned on or off to switch the characteristics of the equalizer.

DESCRIPTION OF THE PREFERRED EMBODIMENT

Figure 1:
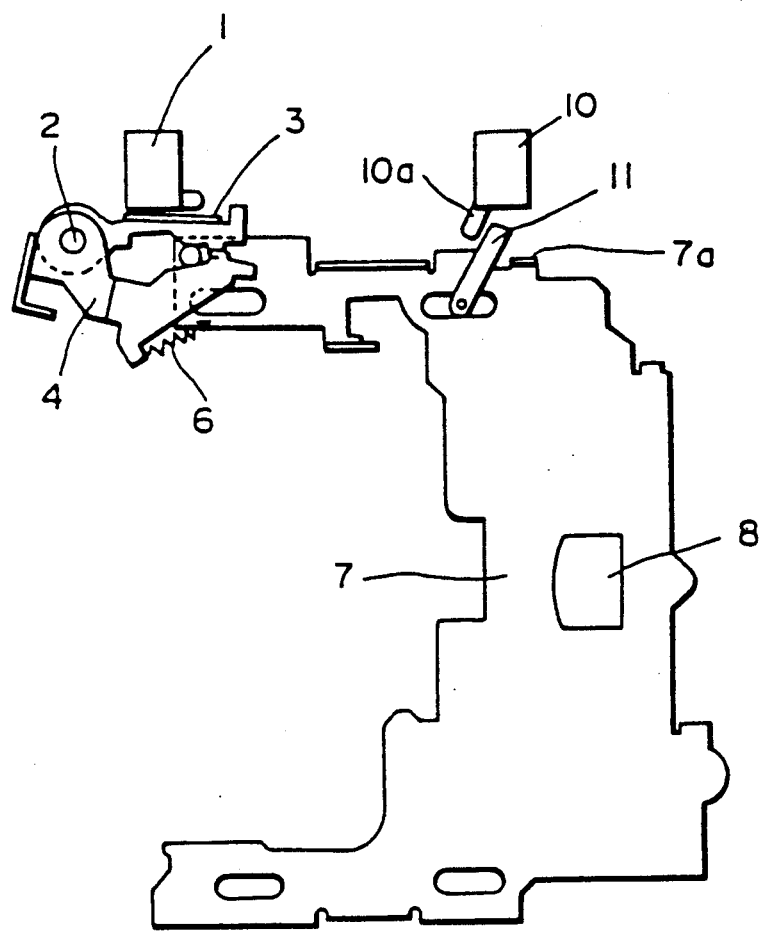
FIG. 1 is a plan view of a preferred embodiment of a detection device of the present invention.

A preferred embodiment of the invention will now be described with reference to the drawings.

A switch 1 for detecting tape characteristics is turned on and off by an urging portion 3a of a switching piece 3 mounted on a shaft 2 for pivotal movement. The switching piece 3 is urged by an urging force of an operating member 1a of the switch 1, and therefore so long as an external force is not applied to the switching piece 3, the switch 1 is in the OFF state.

A detecting piece 4 is mounted on the shaft 2 for pivotal movement, and has a detecting portion 4a which is insertable into a tape characteristic hole 5 formed in a rear face of a cassette half A which is representative of an equalizer characteristic of 70 μ. A spring 6 is connected at one end thereof to the detecting piece 4 to urge the detecting portion 4a in a direction toward the tape characteristic hole 5.

A recording/reproducing head 8 is mounted on a head bed 7, and a pin 9 serving as an operating piece is also mounted on the head bed 7. The pin 9 is engageable with a cam portion 3b of the switching piece 3 and a cam portion 4b of the detecting piece 4. In accordance with the position of the pin 9 relative to the cam portion 4b, a projecting portion 4c of the detecting piece 4 urges the urging portion 3a of the switching piece 3 under the influence of the spring 6.

A second switch 10 is mounted on a chassis, and is urged by one end of a lever 11, received in a claw portion 7a formed on the head bed 7, to be turned on when the head bed 7 is moved to the recording/reproducing position.

Figure 2:
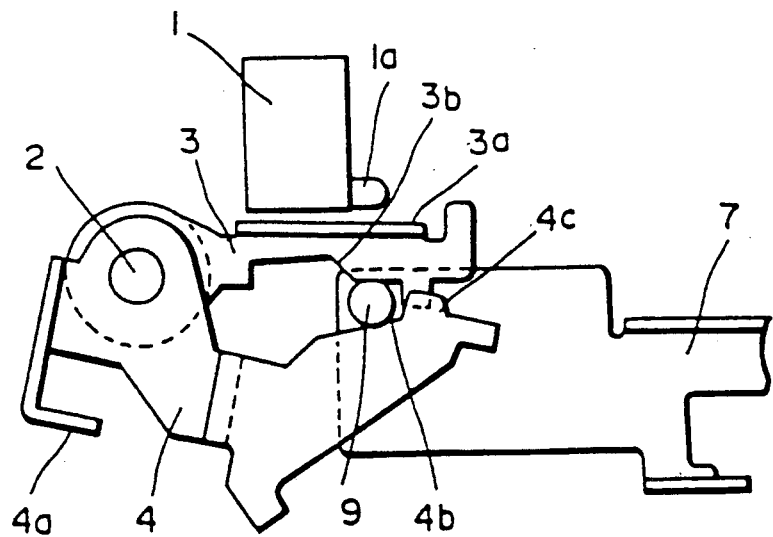
FIGS. 2 to 5 are fragmentary plan views of the device, showing an eject position, a music stop-detecting position, a recording/reproducing position with a 70 μ tape, and the recording/reproducing position with a normal tape, respectively.

According to the invention, when the head 8 on the head bed 7 is at the eject position where the head 8 is spaced from the tape of the cassette half A, the cam surfaces 3b and 4b are urged by the pin 9 on the head bed 7, so that the urging portion 3a of the switching piece 3 urges the operating member 1a of the switch 1 to maintain the switch 1 in the ON state, as shown in FIG. 2.

At this time, the detecting piece 4 acts against the bias of the spring 6 so that the detecting portion 4a is maintained out of contact with the cassette half A. Additionally, an operating member 10a of the second switch 10 is not urged by the lever 11 so that the second switch 10 is in the OFF state.

Figure 3:
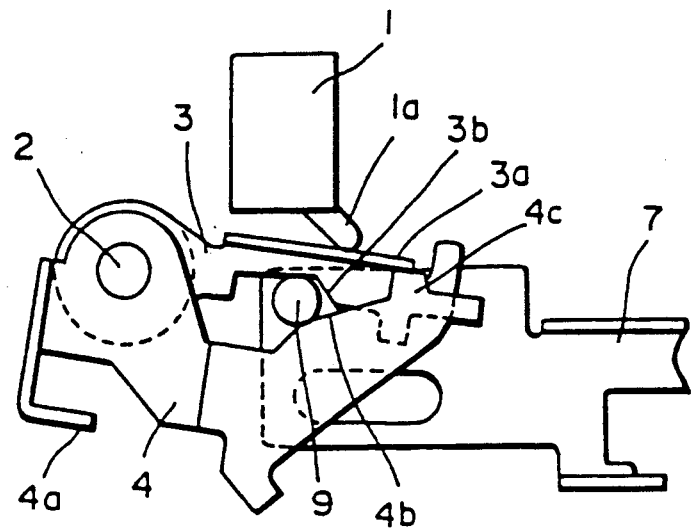

Then, as shown in FIG. 3, when the head bed 7 is moved to the music stop-detecting position where the head 8 is in slight contact with the tape so as to effect the fast forward and reverse of the tape, the pin 9 reaches a recess in the cam surface 3b, so that the operating member 1a of the switch 1 urges the switching piece 3 to cause the switch 1 to turn off.

At this time, the detecting portion 4a of the detecting piece 4 is not angularly moved to such a degree as to be inserted into the tape characteristic hole 5 and the second switch 10 remains open in the OFF state.

Figure 4:
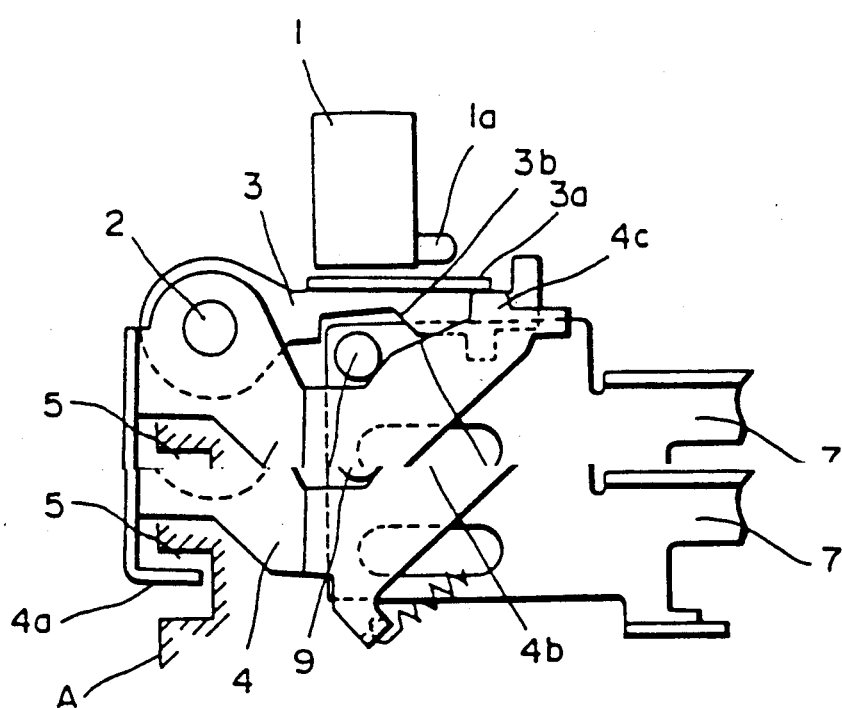
Figure 5:
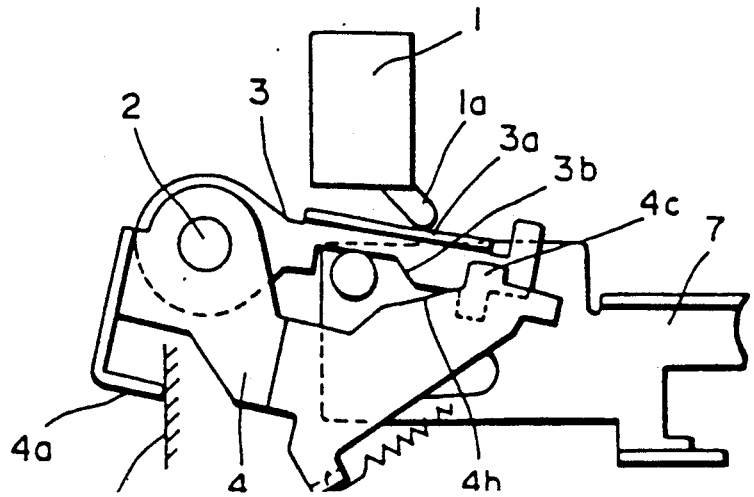
Figure 6:
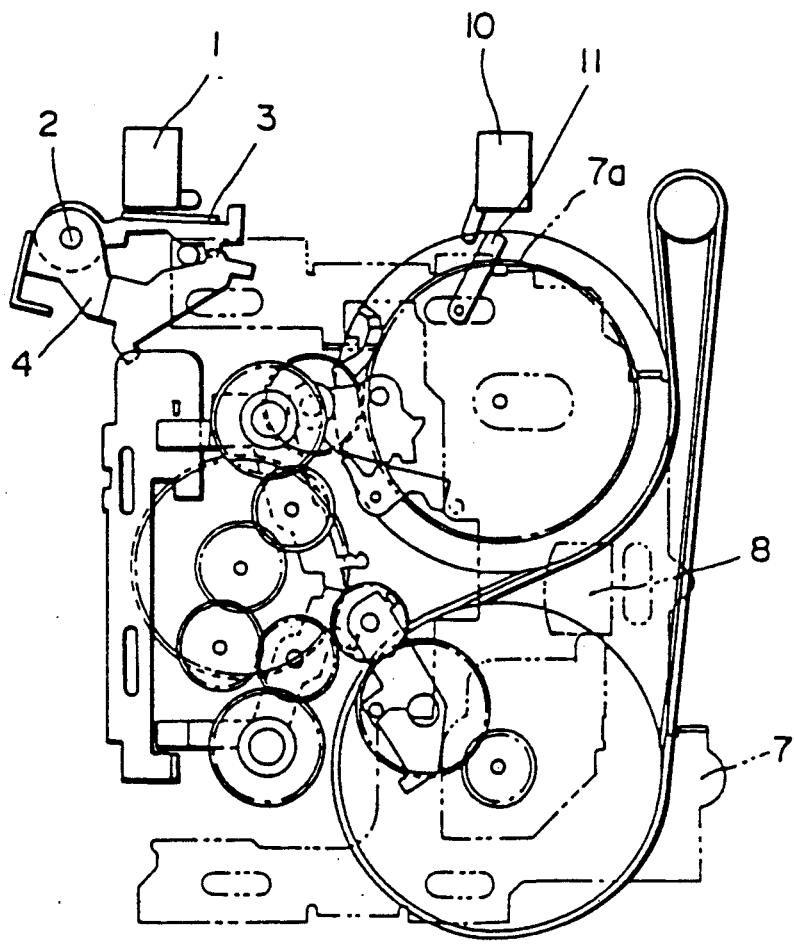
FIG. 6 is a plan view of an overall construction of the detection device of the invention.

Thereafter, when the head bed 7 further moves so as to reach the position illustrated in FIGS. 4 and 5 where the head 8 is in intimate contact with the tape to effect the recording or the reproduction, a recess in the cam portion 4b is in registry with the pin 9, so that the detecting piece 4 angularly biased under the influence of the spring 6.

At this time, when the cassette half A contains a chrome tape or a metallic tape and has the tape characteristic hole 5 in its rear face the detecting piece 4 is angularly moved in such a manner that the detecting portion 4a is inserted into the tape characteristic hole 5 as shown in FIG. 4, so that the projecting portion 4c urges the urging portion 3a. The urging portion 3a in turn urges the operating member 1a of the switch 1 to cause the switch 1 to turn on as illustrated in FIG. 4.

However, when the cassette half A is one holding a normal tape and is not provided with the tape characteristic hole 5 in its rear face, the detecting portion 4a is brought into contact with the rear face of the cassette half A, thereby preventing the angular movement of the detecting piece 4, as shown in FIG. 5. Therefore, the projecting portion 4c of the detecting piece 4 is unable to urge the urging portion 3a, so that the switch is in the OFF state.

In the above recording/reproducing position, the lever 11 is urged by the claw portion 7a on the head bed 7 and is angularly moved so that the second switch 10 is turned on.

Figure 7:
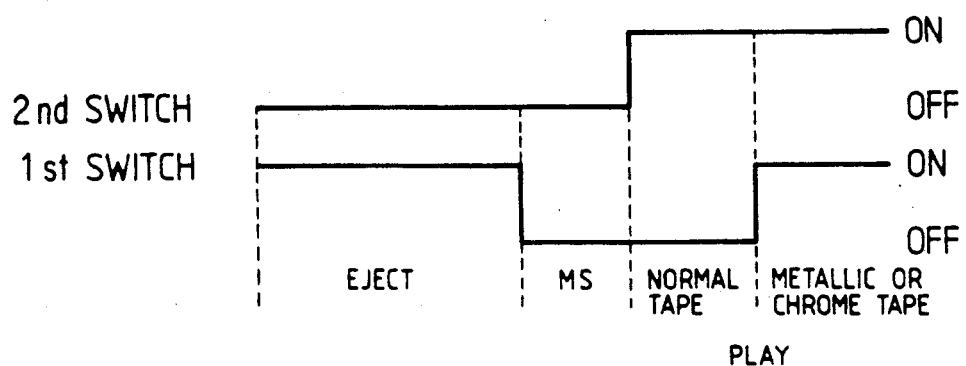
FIG. 7 is a flow chart showing the operation of the first and second switches.

In other words, as shown in FIG. 7, when the second switch 10 is in the OFF state, with the switch 1 being in the ON state the eject position is detected. When the second switch 10 remains in the OFF state, with the switch 1 turned off, the music stop-detecting position is detected. When the second switch 10 is turned on, the recording/reproducing position is detected.

In this recording/reproducing position, that is, in the ON state of the second switch 10 when the switch 1 is turned on, the use of the 70 $\mu$ tape is detected and when the switch 1 is turned off, the use of the normal tape is detected. In accordance with this, the equalizer of the player is switched.

As described above in the present invention, the discrimination between the 70 $\mu$ tape and the normal tape as well as the detection of the three positions (i.e., the eject position, the music stop-detecting position and the recording/reproducing position) of the head bed can be made using the two switches. Such detections have conventionally been made using at least three switches.

The reduced number of the switches reduces the number of the component parts, and improves the reliability since the probability of malfunction of the switches due, for example, to a switch contact problems, is reduced.

We claim:

1. A device for detecting whether a tape is a normal tape or a chrome or metallic tape and for detecting whether a recording/reproducing head is at an eject position, a stop portion or a rewind or fastforward position, said device being for a cassette tape player, the cassette tape player including a chassis and said recording/reproducing head mounted on a movable head bed, said device comprising:

a first switch that turns on when said head is in a recording or reproducing position;
   an operating piece movable in accordance with the movement of said head;
   a switching piece for turning on and off said first switch, said switching piece having a cam surface engageable with said operating piece;
   a detecting piece having a cam surface engageable with said operating piece and having a detecting portion insertable into a tape characteristic hole formed in a cassette half, said hole being indicative of whether said tape is a normal tape or a chrome or metallic tape; and
   a second switch mounted on said chassis in spaced apart relation to said first switch and positioned so as to be turned on and off by said movable head bed in accordance with the movement of said head.

2. The device of claim 1, wherein said detecting piece has a projecting portion which is contactable with said switching piece.

3. The device of claim 1, wherein when said head is in the eject position said cam surfaces of said switching piece and said detecting piece are moved by said operating piece such that the switching piece turns said first switch to the on position.

4. The device of claim 3, wherein when said head is in the eject position said detecting portion of said detecting piece is prevented from being inserted into said hole due to said operating piece.

5. The device of claim 1, wherein said cam surface of said switching piece has a recess into which said operating piece is positioned when said head is in said stop position such that said first switch is turned to the off position.

6. The device of claim 5, wherein when said head is in the stop position said second switch is in the off position.

7. The device of claim 1, wherein when said head is in the recording state said detecting portion is able to detect the presence or absence of said characteristic hole, and wherein when said hole is present said detecting piece urges said switching piece so as to cause said first switch to be turned to the on position.

8. The device of claim 7, wherein when said head is in the recording state said second switch is turned to the on position by movement of said head to said recording state.

* * * * *